(12) United States Patent
Choat et al.

(10) Patent No.: US 6,938,842 B2
(45) Date of Patent: Sep. 6, 2005

(54) FLOW CONTROL FOR IRRIGATION MACHINES

(75) Inventors: Wayne D. Choat, St. Edward, NE (US); Robert E. Callies, Leigh, NE (US)

(73) Assignee: Lindsay Manufacturing Company, Lindsay, NE (US)

( * ) Notice: Subject to any disclaimer, the term of this patent is extended or adjusted under 35 U.S.C. 154(b) by 0 days.

(21) Appl. No.: 10/444,613

(22) Filed: May 23, 2003

(65) Prior Publication Data

US 2004/0232261 A1 Nov. 25, 2004

(51) Int. Cl.⁷ .................................................. B05B 3/12
(52) U.S. Cl. ...................................... 239/729; 239/728
(58) Field of Search ............................... 239/728, 729, 239/730, 731, 732, 733

(56) References Cited

U.S. PATENT DOCUMENTS

| | | | |
|---|---|---|---|
| 3,797,517 A | * | 3/1974 | Kircher et al. ............... 239/738 |
| 3,902,668 A | * | 9/1975 | Daugherty et al. .......... 239/729 |
| 3,979,062 A | * | 9/1976 | Christensen et al. ........... 239/11 |
| 4,161,292 A | * | 7/1979 | Holloway et al. ............. 239/11 |
| 4,249,698 A | * | 2/1981 | Smith et al. ..................... 239/1 |
| 4,340,183 A | * | 7/1982 | Kegel et al. ................. 239/729 |
| 4,508,269 A | * | 4/1985 | Davis et al. ................. 239/729 |
| 5,785,246 A | * | 7/1998 | King et al. ..................... 239/11 |
| 6,007,004 A | * | 12/1999 | Unruh ......................... 239/729 |
| 6,045,065 A | * | 4/2000 | Gerdes ........................ 239/729 |
| 6,045,066 A | * | 4/2000 | Gerdes et al. .............. 239/729 |
| 6,085,999 A | * | 7/2000 | Gerdes et al. .............. 239/729 |
| 6,666,384 B2 | * | 12/2003 | Prandi ............................ 239/1 |

* cited by examiner

Primary Examiner—William C. Doerrler
(74) Attorney, Agent, or Firm—Hovey Williams LLP

(57) ABSTRACT

This invention relates to a fluid flow control method that enables a self-propelled irrigation machine to apply varying amounts of fluid as might be required to suitably treat the surface area affected by each of the individual fluid application devices thereon. The control method regulates the total volume of fluid emitted by each application device to a predetermined value as it responds to a suitable control signal to permit or prevent fluid flow. This fluid flow control method involves time-based rapid cycling of the flow control apparatus to provide continuously variable fluid flow as is required to meet the desired average output of each emitting device as the flow requirement varies from time to time as needed to produce a selected, pre-determined application rate throughout the treated surface area.

36 Claims, 4 Drawing Sheets

FLOW CONTROL FOR IRRIGATION MACHINES

BACKGROUND OF THE INVENTION

Agricultural irrigation machines of the type known as center pivot machines have a main pipeline section supported at intervals on movable towers for rotation about an inner end of the pipeline. Water is supplied to the fixed, inner end of the pipeline and distributed through sprinklers or other fluid emitting devices placed along or supported from the pipeline. The movement of the main pipeline section about its central pivot point irrigates a circular portion of a field. The circular portion swept by the main pipeline is designated herein the primary field space. This leaves the corners of square or rectangular fields or other irregular perimeter areas without irrigation. In installations where the additional productive capacity of a field's corners or irregular perimeter areas warrants, the corners or irregular perimeter areas can be irrigated by adding an auxiliary span or spans near the outer end of the main pipeline for irrigating areas of the field outside of the circular area. These areas to be irrigated outside the primary field space are herein designated the secondary field space. The auxiliary span or spans are in fluid communication with and supplied by the outer end of the main pipeline section. Such an auxiliary structure is capable of moving as needed to extend into the corners or other irregular areas while also moving to keep up with the main pipeline section's rotation about the center pivot.

A commonly-used motion control scheme for center pivot units causes the outermost tower on the main pipeline section to advance independently at a user-defined speed. All inboard towers advance as needed to keep the main pipeline straight. The auxiliary structure may be pivotally connected near the outer end of the main pipeline and supported on an auxiliary tower. The auxiliary tower may travel inside or outside of the main circle, following its own guide path. That path may be defined by various means, such as a buried cable. The guide path for the auxiliary tower extends at least partially into the corners or irregular perimeter areas of the fields, thereby causing the auxiliary structure to move out into any irregular area when the main pipeline is adjacent to such a feature. As the auxiliary structure moves into, through, and out of such secondary field space, the fluid emitting devices mounted thereon or supported therefrom are required to provide varying amounts of fluid as the field surface "area of responsibility" for each emitting device changes and as the velocity of each emitting device changes. When the main pipeline is adjacent the side of a field the auxiliary tower usually lags behind the main pipeline, thereby folding the auxiliary structure back in to a trailing position behind the main structure. With the auxiliary structure in this position the fluid emitting devices mounted thereon are required to provide very little if any contribution as the field surface area is effectively treated by the emitter devices on the main pipeline.

The object of both the main pipeline span and the auxiliary span is to apply to the field a user-specified amount of fluid, typically expressed in inches, both in the primary field space and in the secondary field space to suitably treat the surface area affected by each of the individual fluid application devices thereon. Since the emitters on the main pipeline move in a relatively uniform way, adjustments in their size and spacing can readily accommodate their differences in area of responsibility arising from different radial locations on the main pipeline. However, such adjustments cannot be used to address the situation faced by the auxiliary span emitters. The movements of these emitters create irregularities in both the sizes of their zones of responsibility and the amount of time they spend in those zones. These irregularities make it difficult to apply the desired amount of irrigation in the secondary field spaces.

In the past, controls for the emitters on the auxiliary span have relied primarily on a measurement of a control angle between the auxiliary span and the main pipeline. Different auxiliary span emitters, typically ganged into groups or banks of emitters, were successively turned on as the control angle increased beyond 85°. Eventually when the control angle became large enough, which meant the auxiliary span was well extended beyond the primary field space, all of the banks were turned on. As the auxiliary span folded back in and the control angle became smaller, the banks were successively turned off. The banks were set up such that a particular bank did not include any adjacent emitters. For example, every tenth emitter would be in a particular bank. Thus, the banks were fully interleaved.

This prior art auxiliary emitter control method for the most part is able to prevent auxiliary emitters from irrigating the primary field space, which would otherwise over-irrigate the outer portions thereof. And the prior art control method generally assures that most of the secondary field space will receive water in some amount. That amount may be too much, it may be too little, or perhaps it may even be the desired amount. Whatever the case may be, the prior art control method can not uniformly vary the average amount of water which is emitted. At most it can turn an emitter on and achieve its full flow rate for a sustained period of time, or turn it off and have a zero flow rate.

As mentioned above, the problem is that both the size of the area of responsibility of a particular emitter and the time available to that emitter in which it can apply water to that area are constantly changing. Furthermore, both of these parameters vary radically among the various emitters on the auxiliary span. The prior art control methods and apparatus are incapable of adequately dealing with these variations.

SUMMARY OF THE INVENTION

This invention relates to a fluid flow control method that enables a self-propelled irrigation machine to apply varying amounts of fluid as might be required to suitably treat the surface area affected by each of the individual fluid application devices thereon as the surface area affected, and/or available exposure duration, vary from time to time as the machine travels along its path.

The control method regulates the total volume of fluid emitted in a given time frame by each application device or emitter to a predetermined value as it responds to a suitable control signal to permit or prevent fluid flow.

This fluid flow control method involves time-based rapid cycling of the flow control apparatus to provide continuously variable fluid flow as is required to meet the desired average output of each emitting device as that requirement changes from time to time.

Flow control cycles are variable in frequency and duration.

Flow control cycles are definable based upon the desired application for a specific area of responsibility.

Rapid cycling causes the fluid emitting devices to emit brief bursts of fluid.

This time-based rapid cycling is utilized to provide the desired output from each emitting device at any given time as the irrigation machine travels along its path.

This fluid flow control method utilizing time-based rapid cycling of the flow control apparatus is capable of providing continuously variable average fluid flow as is necessary to meet the changing requirements as the field surface area of responsibility and/or available exposure duration for each emitting device changes.

The preceding paragraphs illustrate the utilization of this control concept to control the flow of fluid emitted from devices mounted on or supported from an auxiliary span or spans added to the outer end of the main pipeline of a center pivot irrigation system to address the application of fluids to areas beyond the reach of the main structure. These are the features utilized to illustrate the control concept. It must be understood that the control concept claimed herein is not limited to this application, but rather that the control system can be beneficially utilized at any time that the fluid emitting devices are required to provide varying amounts of fluid as the field surface area of responsibility and/or available exposure duration for the various emitting devices changes.

DETAILED DESCRIPTION OF THE INVENTION

Figure 1:
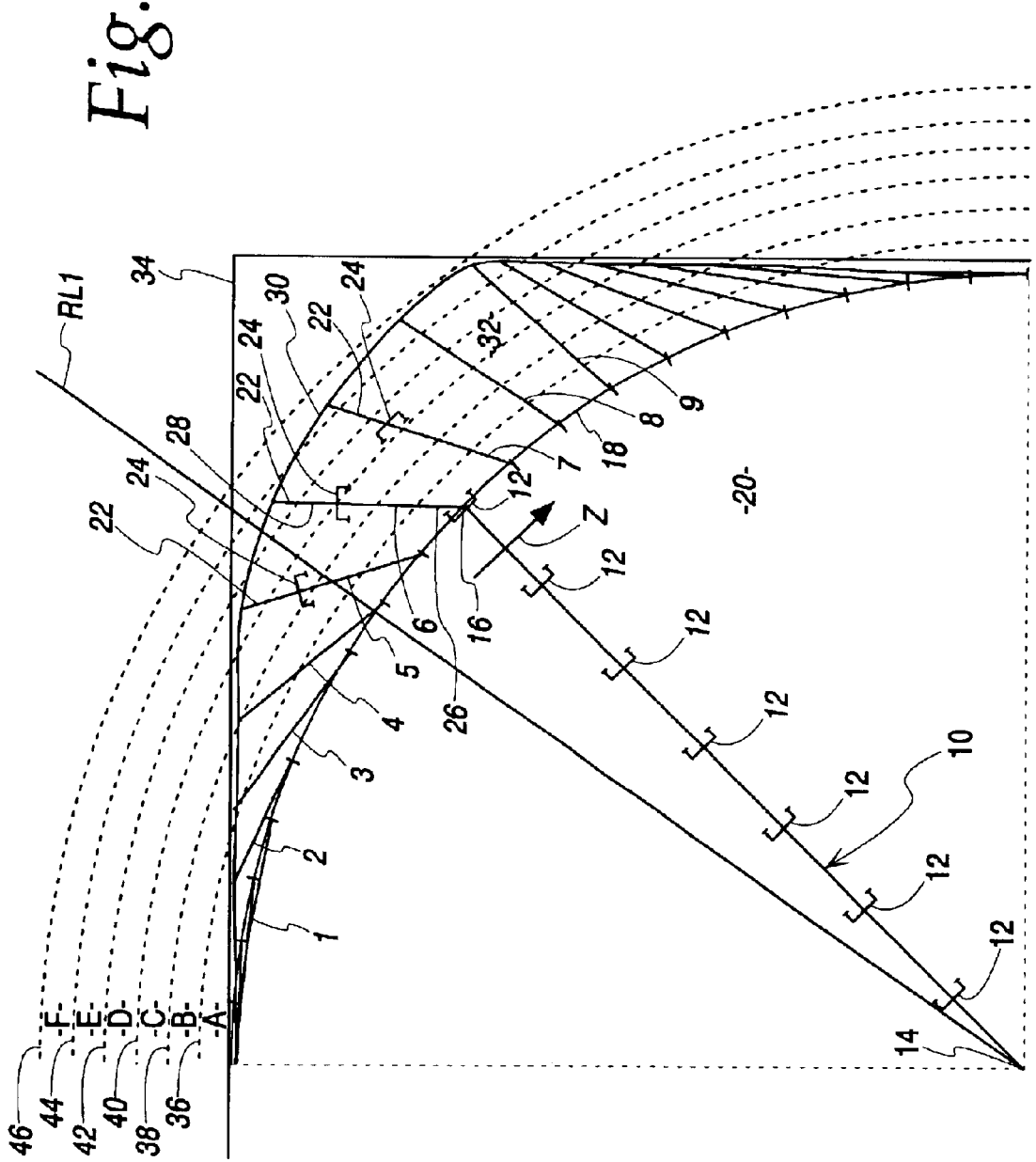
FIG. 1 is a schematic plan view of a quadrant of a first field showing a main pipeline in one position and the auxiliary span in multiple positions.

FIG. 1 schematically illustrates a center pivot irrigation machine according to the present invention. The machine includes a main pipeline 10 mounted on self-propelled towers 12. The inner end 14 of the main pipeline is mechanically connected to a center pivot. Irrigation fluid, which may be water or water mixed with fertilizer, herbicide, insecticide or the like is supplied to the main pipeline at the center pivot. The outer end 16 of the main pipeline describes a circle 18 as it moves in the direction of arrow Z. The circle 18 defines the primary field space 20. Emitters (not shown) are located along the main pipeline for distributing fluid to the primary field space.

An auxiliary span 22 is mounted on an auxiliary tower 24 and connected near an outer end 16 of the main pipeline. The auxiliary span is a pipeline that receives fluid from the main pipeline for distribution through a plurality of auxiliary emitters spaced along the auxiliary span. Two such emitters are shown at 26 and 28. The outer end of the auxiliary span describes an irregular outer boundary 30. The area between boundary 30 and circle 18 is the secondary field space 32. The auxiliary emitters distribute fluid primarily to the secondary field space. A nominal property boundary is illustrated at 34. For clarity of the drawing the emitters 26 and 28 are shown on only one illustration of the auxiliary structure. Similarly, the auxiliary tower is shown on only the illustrations of the auxiliary structure. Obviously the auxiliary tower and emitters are present in each and every position of the auxiliary structure.

FIG. 1 also illustrates a series of imaginary arcs 36, 38, 40, 42, 44 and 46. These arcs are concentric with the center pivot of the irrigation machine. The arcs are equally spaced radially to define a plurality of swaths A–F outside of the primary field space 20. It will be understood that while the main pipeline 10 is shown in only one position in FIG. 1, the auxiliary span 22 is shown in multiple positions. This shows how the auxiliary span moves from a tucked position to an extended position and back again. The tucked position occurs when the auxiliary span is opposite a point where the circle 18 and property boundary 34 converge. In other words, in the field of FIG. 1, the auxiliary span is tucked when it is adjacent to the twelve o'clock position, as well as the three, six and nine o'clock positions. The extended position occurs when the auxiliary span is opposite a corner of the property boundary, e.g., between the one and two o'clock positions. FIG. 1 also illustrates an imaginary radial line (RL1) projecting outwardly from the center pivot to the property boundary.

The emitters can be connected to a control means such as a combined pressure regulator and shut-off valve, as shown in U.S. Pat. No. 6,374,853, the disclosure of which is incorporated herein by reference. Also, as used herein the term emitter can refer to a single device or to a group of devices given the same control signal. Each emitter includes either an internal or external valve that is controllable to start and stop fluid flow from the emitter, such as the valve in the referenced patent. An emitter could also include an end gun.

On any radial line projected outwardly from the center pivot 14 to intercept the path of the auxiliary span, the center of the instantaneous area of responsibility of a given emitter (or bank of emitters) can be represented by the radial distance D beyond the central pivot 14 to the physical center point of the fluid application pattern of that specific emitter as it crosses that radial line. For a given emitter this radial distance obviously increases as the auxiliary span swings out into the secondary field space. Looking at FIG. 1, when the auxiliary span 22 is in position 1, the control angle between the pipeline and auxiliary span is only slightly above 90 degrees and an emitter located such as 26 is so close to the primary field space that it may be shut off. An outer emitter such as at 28 maybe extending slightly into swath A and thus may be turned on. As the auxiliary span swings out to positions 2, 3 and 4, outer emitter 28 has a greater distance D from the pivot point 14 and now takes on a portion of swath B as its area of responsibility. Other emitters closer to outer end 16 become responsible for swath A and are turned on. As the auxiliary span swings out to position 5, the outer emitter becomes responsible for a portion of swath C and hands-off responsibility for inner swaths A and B to more inboard banks. It will also be noted that in order for the outer emitters to cover the greater distances needed to keep up with the main pipeline, the velocity of the auxiliary tower 24 will increase with a corresponding increase in the velocity V of the outer emitters. Once the auxiliary span gets to positions 5 or 6, all of the banks may be required to turn on to cover swaths A–F.

Figure 2:
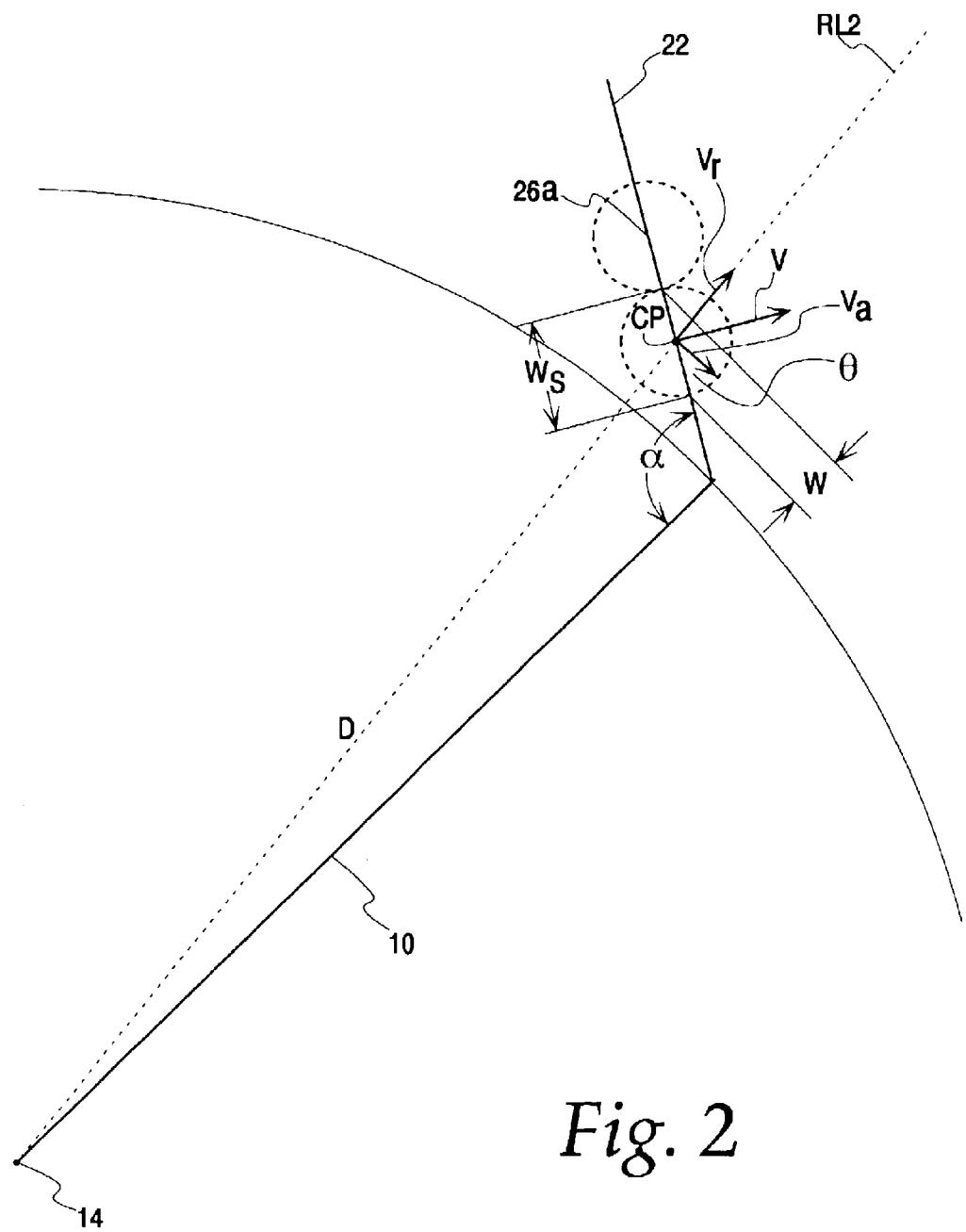
FIG. 2 is an enlarged schematic plan view, similar to FIG. 1, showing the details of an effective width W of an emitter.

As illustrated in FIG. 2, the effective width W of the instantaneous area of responsibility of a given emitter at any given time extends radially both inwardly and outwardly from the center point of the fluid application pattern of that specific emitter to the area of responsibility of the adjacent emitters inboard and outboard. Depending upon the size and shape of the fluid application patterns of the various emitters utilized, the physical application of fluid by a specific emitter may overlap and be overlapped considerably (or not at all) by those of adjacent devices. At such-times as the fluid application patterns of proximate emitting devices adequately overlap, it is possible to combine the flow requirements of those devices into that of a single device or group of devices which is most appropriately located to serve the combined areas.

When the fluid application patterns of adjacent emitters are of equal width, it might be presumed that the effective width of their instantaneous areas of responsibility would likewise be equal when crossing a specific radial line. That assumption, however, would likely be incorrect. Due to the fact that the emitters are spaced along the auxiliary span and that the auxiliary span is caused to change its angular disposition with regard to the main pipeline as it swings into, through, and out of a secondary space, the effective width of the area of responsibility of a given emitter is constantly changing. Further, while the auxiliary span may be at one angular disposition, such as position 4, with respect to the main pipeline as the inboard emitters cross a specific radial line, such as that represented by line RL1 on FIG. 1, it may be at a considerably different angular disposition such as position 5, as the outboard emitters cross that same radial line. Therefore, the effective width W of the area of responsibility for a given emitter as it crosses a specific radial line can only be measured with respect to that of the next emitters inboard and outboard as they cross that same radial line.

Determination of the effective width W of the instantaneous areas of responsibility, and the instantaneous velocities, for each of the respective application devices as they cross a specific radial can be readily calculated once the precise path of the machine, as it crosses that radial, is known. This is illustrated in FIG. 2. Here main pipeline 10 is at an angle α with respect to the auxiliary span 22. An emitter 26 (or the center point CP of a bank of emitters) is shown in an instantaneous position crossing a fixed radial line RL2. Center point CP has a distance D from the pivot point 14 of the machine. Assume the spray pattern for this emitter is circular as shown by the dotted circle about point CP. The spray pattern has a width along the auxiliary span of Ws which, given the assumed circular spray pattern, is the diameter of the circular spray pattern. The center of the emitter CP has an instantaneous velocity vector V which is perpendicular to the auxiliary span 22. This vector resolves into a radial velocity Vr, which is parallel to radial line RL2, and an angular velocity Va, which is perpendicular to the radial line RL2. The angle between the angular velocity vector Va and the auxiliary span is θ. It can be seen from the geometry involved that the effective width W of the instantaneous area of responsibility as it sweeps through a swath in the secondary field space is equal to Ws·sin θ. It will also be appreciated that by time the adjacent outboard emitter 26a reaches radial line RL2, angle α between the main pipeline and auxiliary span will have changed and therefore, θ for emitter 26a will be different than it was for emitter 26 at the time emitter 26 crossed radial line RL2.

In a similar manner, the radial distance D to the physical center point of the fluid application patterns, the effective width W of the instantaneous areas of responsibility, and the instantaneous velocities V, for each of the respective application devices can likewise be determined at any specific point along the path of the machine.

As discussed above it is the objective to maintain a pre-determined, user-selected application rate R, measured in inches, in both the primary and secondary field spaces. The factors in the application rate are: Q, the individual emitter average flow rate, in inches-cubed/second; W, the instantaneous effective width of the area of responsibility of the emitter in inches, and Va, the instantaneous angular velocity of the emitter along its path of movement, in inches/second. Thus, the desired condition is: $R=Q/(W*Va)$ where R is the user-selected rate. Not only is this the desired condition at an individual emitter, it is also desired that all emitters perform together as necessary to suitably treat the surface area affected by each. Since W and Va are constantly changing for a particular emitter, as illustrated above, and W and Va vary among the total emitters, it follows that in order to maintain R accurately for all emitters, Q must be controlled at each emitter as dictated by W and Va at that emitter.

Control of Q can be accomplished by selecting the appropriate percent "ON" time during a given cycle period. Thus, in a given situation, it may be determined from the above equation that Q should be, for example, about half of an emitter full flow rate. To meet that requirement, if a cycle period is chosen to be one minute, the desired average flow rate may be obtained by turning the emitter on for 30 seconds during that cycle time. It is preferable to stagger the on/off times of the various emitters during the cycle period to prevent an excessive number of the emitters from turning on or off at once.

Actual control of Q can be achieved by a computer, typically mounted on the auxiliary tower, that monitors sensed values of W and Va and calculates the appropriate "ON" time percentage to achieve the desired Q. W is sensed by combining the known location of an emitter on the auxiliary span with a measurement of the control angle α between the auxiliary span and the main pipeline. W may also be sensed combining the known location of an emitter on the auxiliary span with a measurement of the angle between the auxiliary span and its travel path. V may be determined through a combination of the velocity of the auxiliary tower and the velocity of the end tower of the main pipeline. V may also be determined through other means. The end tower velocity may be obtained either through the percentage travel rate set by the operator, by the percent of standard rate set at the end tower drive motor or by other means. The auxiliary tower velocity may be determined directly or it may be determined because it is whatever velocity required along its path to maintain a constant distance between the end tower and the auxiliary tower. By combining the emitter location with the velocities of the end tower and auxiliary tower the velocity of the emitter can be derived. Once the computer determines what Q should be it can calculate the appropriate percent "ON" time needed to achieve Q. The percent "ON" time signal is sent to the valve controlling the emitter in question to produce the desired flow rate Q that will in turn produce the desired application rate R. Electrical, hydraulic or pneumatic systems could be used to connect the computer to the emitter's control valves.

While continuous computer monitoring and adjustment of the percent on time is one way to achieve the results of the present invention, an alternate embodiment is contemplated which essentially calculates the percent on times in advance for a particular field. The results are then stored in one or more lookup tables that maintain instructions for each bank of emitters at a particular location on that specific field. Typically more than one lookup table (also known as a program) may be used for a particular field. That is, one lookup table may be appropriate when the pipeline is in one position while another lookup table is preferred as the pipeline makes its way into another position.

Figure 3:
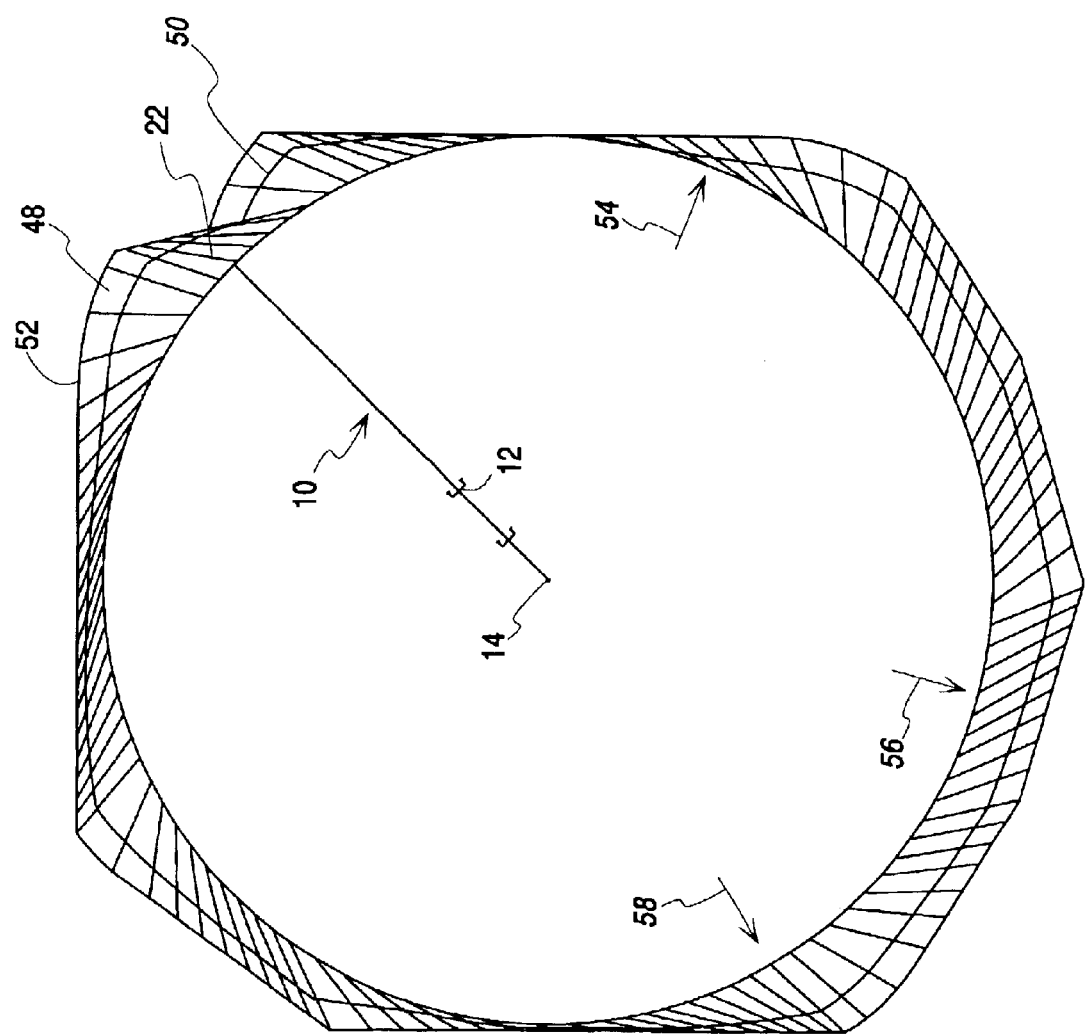
FIG. 3 is a schematic plan view of a second field showing where various programs might be used.

FIG. 3 illustrates an example of a field having an irregular secondary field space 48. Line 50 describes the path of the auxiliary tower. Line 52 defines the outer boundary of the secondary field space, i.e., the extent of the surface area that can be irrigated by the auxiliary span. As the main pipeline 10 approaches the four o'clock position, indicated by arrow 54, a look up table called "forward opening" may be selected for use. When the seven o'clock position (arrow 56) is approached a second lookup table called "forward holding" may be used. As the eight o'clock position (arrow 58) arrives the auxiliary span is going to be heading back to a tucked position and a third lookup table or program called "forward closing" may be preferred. These lookup tables or programs may vary further as the auxiliary span goes between tucked and extended positions.

One alternate means of establishing in advance lookup tables with the percent "ON" times of the emitters to be controlled on the auxiliary span is by combining the known location and shape of the emitter fluid application pattern with a measurement of the control angle α between the auxiliary span and the main pipeline and the relative velocities of the end tower and auxiliary tower. In operation, once the computer determines the above angle and relative velocities, it can select from the appropriate table the percent "ON" time needed to control the various emitters. The percent "ON" time signals are sent to the valves controlling the emitters in question to produce the desired application.

Another alternate means is by combining the known location and shape of the emitter fluid application pattern with a measurement of the control angle between the auxiliary span and the travel path of that span and the relative velocities of the end tower and auxiliary tower.

A further alternate means is by combining the known location and shape of the emitter fluid application pattern with a measurement of the control angle α between the auxiliary span and the main pipeline, a measurement of the control angle between the auxiliary span and the travel path of that span, and the velocities of either or both of the end tower and auxiliary tower.

Alternately, with the total path of the machine known and stored in a database, all necessary table information can be pre-determined and combined into a single table.

Figure 4:
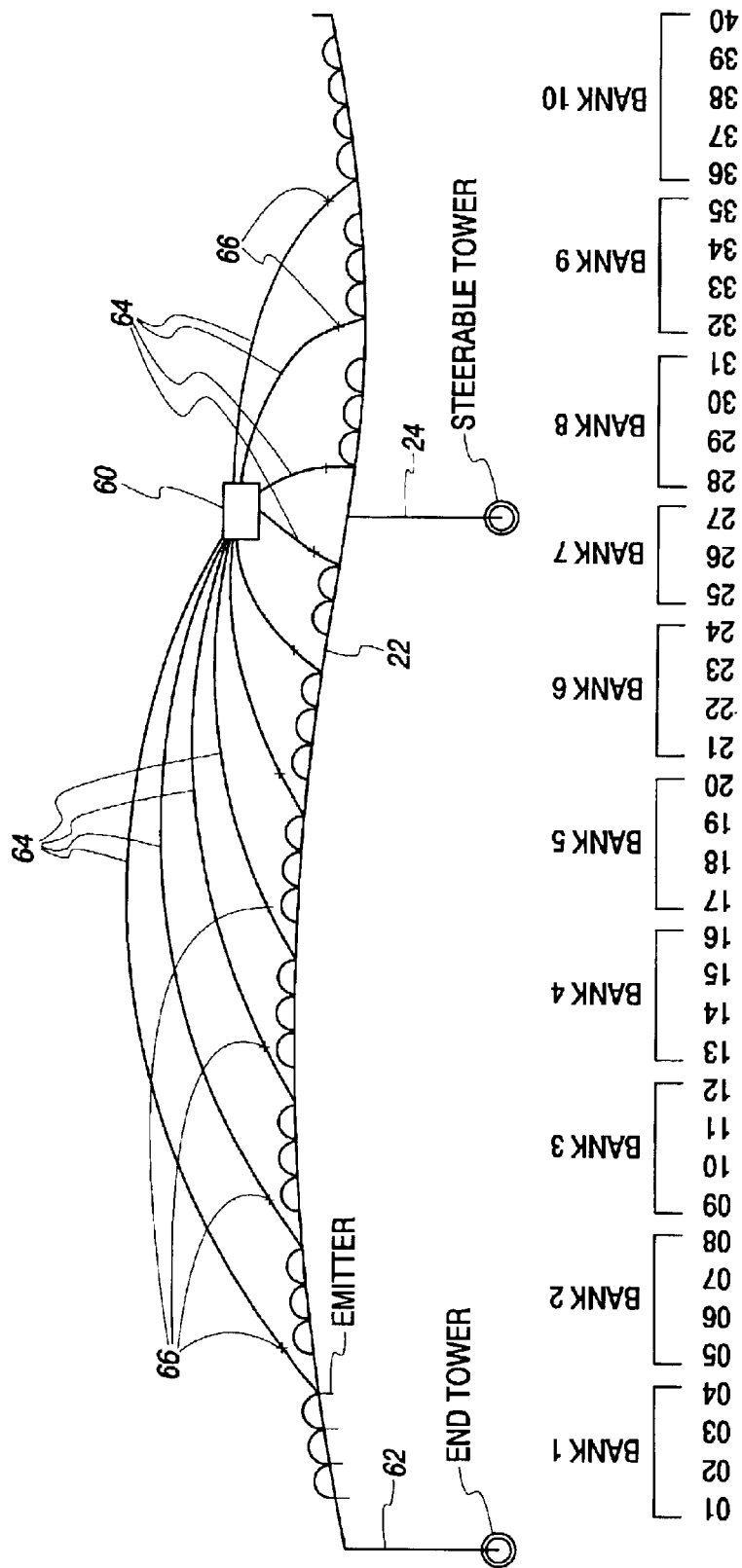
FIG. 4 is a schematic elevation view of the banking configuration on the auxiliary span used in the specific field of FIG. 3.

FIG. 4 illustrates the banking configuration on the auxiliary span that may be appropriate for a field set up as in FIG. 3. A control computer 60 is mounted on the auxiliary tower 24. The end or outermost tower of the main pipeline, that is, the one closest to the auxiliary span, is shown at 62.

The auxiliary span 22 has a total of forty emitters in banks of three, four and five. Each emitter is connected to one of the control lines 64. Each control line 64 includes a quick exhaust valve. The quick exhaust valves are indicated schematically at 66. The control lines are each successively connected to a plurality or bank of emitters. In the embodiment shown the emitters are daisy-chained to the control lines. In the illustration of FIG. 4, each intersection of one of the control lines 64 with the auxiliary span 22 represents an emitter. Note that the emitters in a particular bank are adjacent one another. There is no interleaving of emitters required within a bank. This is contrary to the banking configurations of prior irrigation machines and it allows simplified control apparatus, particularly where hydraulic or pneumatic controls are used.

With the banking configuration of FIG. 4 operating on the field of FIG. 3, an example of a "forward opening" program or lookup table might be as shown in the following chart. At the top of the chart there is a conversion table for each bank as it relates to its corresponding output. The sequence of numbers in brackets { } is the rapid cycling programming. For example, the first line {7,8800,60,0} means that Output 7 (which is Bank 1, per the conversation table) at a control angle of 88.00 degrees between the auxiliary span and the main pipeline is ON 60% out of 60 seconds. The 0 is a time slot for the cycling to prevent all banks from shutting off at the same time.

Program: Opening
Forward Standard
Cycle Length: 60 seconds
(Potential Settings: 30 seconds to 600 seconds)
Bank to Output
Conversion Table (used to derive data below

| Bank | Output |
|---|---|
| 0 | NA |
| 1 | 7 |
| 2 | 2 |
| 3 | 4 |
| 4 | 1 |
| 5 | 9 |
| 6 | 6 |
| 7 | 3 |
| 8 | 8 |
| 9 | 0 |
| 10 | 5 |

{7, 8800, 60, 0},
{2, 8800, 10, 60},
{0, 8800, 30, 70},
{3, 8800, 50, 50},
{8, 8800, 50, 50},
{1, 8800, 20, 70},
{5, 8800, 20, 10},
{9, 8800, 20, 30},
{9, 8800, 20, 50},
{4, 8800, 10, 0},
{2, 9100, 0, 0},
{1, 9100, 0, 0},
{7, 9100, 70, 0},
{6, 9100, 30, 70},
{3, 9100, 30, 0},
{5, 9100, 70, 30},
{8, 9100, 50, 0},
{0, 9100, 50, 50},
{9, 9100, 20, 60},
{4, 9100, 20, 80},
{7, 9600, 60, 0},
{3, 9600, 40, 60},
{8, 9600, 40, 0},
{5, 9600, 60, 40},
{0, 9600, 40, 0},
{2, 9600, 30, 40},
{4, 9600, 30, 70},
{6, 9600, 30, 10},
{9, 9600, 30, 40},
{1, 9600, 30, 70},
{5, 10100, 100, 0},
{7, 10100, 70, 0},
{1, 10100, 30, 70},
{8, 10100, 50, 0},
{2, 10100, 50, 50},
{0, 10100, 50, 0},
{4, 10100, 40, 50},
{6, 10100, 40, 20},
{9, 10100, 40, 60},
{3, 10100, 40, 0},
{7, 10600, 80, 0},
{6, 10600, 50, 0},
{4, 10600, 50, 50},
{3, 10600, 50, 0},
{8, 10600, 50, 50},
{2, 10600, 40, 10},
{0, 10600, 50, 50},
{9, 10600, 40, 0},
{1, 10600, 30, 40},
{7, 11100, 80, 0},
{2, 11100, 30, 0},
{4, 11100, 70, 30},
{1, 11100, 70, 0},
{9, 11100, 70, 30},
{6, 11100, 70, 30},

-continued

{3, 11100, 70, 30},
{8, 11100, 70, 0},
{0, 11100, 70, 30},
{8, 11200, 90, 0},
{0, 11200, 90, 10},
{7, 11200, 80, 0},
{6, 11200, 80, 20},
{4, 11200, 70, 0},
{2, 11200, 30, 70},
{1, 11200, 70, 30},
{9, 11200, 70, 0},
{3, 11200, 70, 30},
{7, 11600, 90, 0},
{1, 11600, 80, 20},
{6, 11600, 80, 0},
{8, 11600, 80, 20},
{0, 11600, 80, 0},
{4, 11600, 70, 30},
{3, 11600, 70, 0},
{2, 11600, 60, 40},
{9, 11600, 60, 0},
{9, 12100, 100, 0},
{3, 12100, 100, 0},
{8, 12100, 100, 0},
{0, 12100, 100, 0},
{1, 12100, 90, 0},
{7, 12100, 80, 20},
{6, 12100, 80, 0},
{2, 12100, 70, 30},
{4, 12100, 70, 0},
{1, 12600, 90, 0},
{7, 12600, 80, 20},
{4, 12600, 80, 0},
{9, 12600, 80, 20},
{6, 12600, 80, 0},
{8, 12600, 80, 20},
{0, 12600, 80, 0},
{2, 12600, 70, 30},
{3, 12600, 70, 0},
{8, 12900, 90, 0},
{0, 12900, 90, 10},
{7, 12900, 80, 0},
{4, 12900, 80, 20},
{2, 12900, 70, 0},
{1, 12900, 70, 30},
{9, 12900, 70, 0},
{6, 12900, 70, 30},
{3, 12900, 70, 0},
{7, 13100, 100, 0},
{1, 13100, 90, 0},
{3, 13100, 90, 10},
{4, 13100, 80, 0},
{8, 13100, 80, 20},
{0, 13100, 80, 0},
{2, 13100, 70, 30},
{6, 13100, 70, 0},
{9, 13100, 60, 40},
{2, 13300, 100, 0},
{4, 13300, 100, 0},
{1, 13300, 100, 0},
{9, 13300, 100, 0},
{6, 13300, 100, 0},
{3, 13300, 100, 0},
{8, 13300, 100, 0},
{0, 13300, 100, 0} };

Obviously the technique of developing one or more lookup tables that maintain instructions for each bank of emitters at a particular location on that specific field reduces the computer capability that has to be provided on the auxiliary tower or elsewhere, as opposed to an alternate embodiment wherein continuous computer monitoring and adjustment of the percent on time is accomplished as the machine follows its path. It will be understood that this lookup table shown is for purposes of example only and is not to be considered limiting in any way. Different fields will require different values. Further, different programs, such as a holding forward program, or a closing forward program would have different values for the percent on times. In addition, optional alternate programs could be provided wherein alternate desired application rates are provided.

The values of the percent on times may be derived from pre-calculating $Q/(W*Va)=R$ for each control angle and each bank at any location within the field. They may also be determined by means of trial and error analysis of the water application patterns of the various emitters and their interaction in order to obtain the optimum desired application for each specific area. They may also be determined by continuous computer monitoring of the machine and adjustment of the percent on time to meet the appropriate requirements as the machine follows its path.

Another alternate means of determining the appropriate on and off cycling rates for the various emitters is as follows: With the total path of the machine and auxiliary span known and stored in a database, a series of initial computer simulations can be performed to determine the maximum volume of fluid applied by each of the various emitting devices to each of its affected areas as that specific device travels its full path of the field. The application volumes of the various emitting devices affecting any specific area can then be individually adjusted to provide the desired combined application to all affected areas. As previously stated, at such times as the fluid application patterns of proximate emitting devices adequately overlap, it is possible to combine the flow requirements of those devices into that of a single device or group of devices most appropriately located to serve the combined areas.

While a preferred form of the invention has been shown and described, it will be realized that alterations and modifications may be made thereto without departing from the scope of the following claims. For example, while the auxiliary span can be a swing span on the outer end of center pivot, as shown in FIG. 1, alternatively it could be a Z-span on a center pivot as shown in U.S. Pat. No. 4,674,681, or it could be a Z-span on a lateral move machine. Also, the application rate R is a user-selected, desired rate. While a common choice might be to make the application rate R uniform throughout both the primary and secondary field spaces, this is not necessarily always the selected choice. Particular field conditions, e.g., varying soil types, varying elevations, local obstacles such as rocks or the like, may dictate that a particular spot on a field be irrigated at a rate that is different from rates in other locations. In the case of a local rocky zone that cannot grow any crops, the desired rate may even be zero. The present invention accommodates such variations and allows the secondary field space to receive variable application rates.

We claim:

1. An irrigation machine, comprising:
   a main pipeline supported on movable towers and connectable to a fluid supply, the towers being capable of moving the main pipeline such that it sweeps across a primary field space;
   an auxiliary span supported on at least one auxiliary tower and in fluid communication with the main pipeline, the auxiliary tower being capable of traveling either within a secondary field space generally outside of the primary field space or from the primary field space into and out of a secondary field space, such that the auxiliary span selectively sweeps across the secondary field space;
   a plurality of auxiliary fluid emitters connected to the auxiliary span, each emitter being adapted for selectively emitting fluid, at least some of said emmiters being arranged in a plurality of banks with each bank containing several emitters; and a control system connected to the auxiliary emitters for controlling the emitters such that the fluid flow rates from the emitters produce a selectable, pre-determined fluid application rate across the secondary field space, said control system being operable to cycle each bank of emitters through repeated operating cycles at predetermined time intervals as the auxiliary span moves through the secondary field space and to cause the on times of at least some of the banks to differ from those of other banks during at least some of the operating cycles, the length of on time of a bank of emitters during an operating cycle depending at least in part upon the position of the auxiliary span.

2. The irrigation machine of claim 1 wherein the emitters of each bank are disposed in succession beside one another, said control system being operable to generate a control signal for each bank of emitters, each bank of emitters being connected to the control system such that all the emitters in the bank receive the same control signal.

3. The irrigation machine of claim 1 wherein the control system generates a control signal for each bank, which control signal cycles the emitters at such a rate as to provide the selectable, pre-determined fluid application rate.

4. The irrigation machine of claim 3 wherein said control system includes a data storage means and wherein the on times of the control signals are stored in one or more data tables in said data storage means.

5. The irrigation machine of claim 4 wherein the on times in the data tables for the various emitters are determined by evaluating the physical size and shape of the fluid application patterns of the emitters, the relative contribution of each toward the desired application to a specific location, and the optimization of their individual on times to approach the desired total application at that specific location.

6. The irrigation machine of claim 5 wherein the on times in the data table are selected in response to a measurement of the control angle between the auxiliary span and the main pipeline and the relative velocities of the end tower and auxiliary tower.

7. The irrigation machine of claim 5 wherein the on times in the data table are selected in response to a measurement of the angle between the auxiliary span and its travel path and the relative velocities of the end tower and auxiliary tower.

8. The irrigation machine of claim 5 wherein the on times in the data table are selected in response to a measurement of the control angle between the auxiliary span and the main pipeline, a measurement of the angle between the auxiliary span and the travel path of that span, and the velocities of either or both of the end tower and auxiliary tower.

9. The irrigation machine of claim 5 wherein, with the total path of the machine known, all necessary table information can be pre-determined and combined into a single table and stored in a database, the on times of the rapid cycling is controlled with a measurement of the physical position of the machine along the travel path of that machine.

10. The irrigation machine of claim 1 wherein said control system comprises:

means for determining the instantaneous distance D of each auxiliary emitter from the central pivot point;

means for determining the instantaneous effective width W of the zone of responsibility for each auxiliary emitter;

means for determining the instantaneous angular velocity Va of each auxiliary emitter; and means responsive to the instantaneous effective width W and the instantaneous angular velocity Va of each auxiliary emitter to turn said emitter on as needed to produce an average flow rate Q at said emitter such that Q/(W*Va) equals the selectable, pre-determined fluid application rate.

11. The irrigation machine of claim 10 wherein the instantaneous distance D from the central pivot point to the physical center point of the fluid application pattern of each auxiliary emitter is determined as a function of the angle between the auxiliary span and the main pipeline, the distance of each auxiliary emitter fluid application pattern from the end of the main pipeline, and the length of the main pipeline.

12. The irrigation machine of claim 10 wherein the instantaneous effective width W of the area of responsibility of each auxiliary emitter is determined as a function of the angle between the auxiliary span and the main pipeline, the distance along the auxiliary span of each auxiliary emitter application pattern from the end of the main pipeline, by the radial distance D from the central pivot to the physical center point of the fluid application pattern of that specific emitter, by the radial proximity of the adjacent inboard and outboard emitters, by the relative physical fluid application pattern of each emitter, and by the length of the main pipeline.

13. The irrigation machine of claim 10 wherein the instantaneous velocity V of each auxiliary emitter is determined as a function of the velocity of the main pipeline tower that is closest to the auxiliary span and the velocity of the auxiliary tower.

14. The irrigation machine of claim 1 wherein the main pipeline travels in a circle and the primary field space is circular.

15. The irrigation machine of claim 14 wherein the control system includes a data table into which appropriate percent on time values for each bank have been placed.

16. The irrigation machine of claim 15 wherein the percent on time values are pre-calculated according to the relation Q/(W*Va)=R where R is the selected fluid application rate, Q is the average flow rate at each emitter, W is the instantaneous effective width of a zone of responsibility of each auxiliary emitter, and Va is the instantaneous angular velocity V of each auxiliary emitter.

17. In an irrigation method using an irrigation machine of the type including a main pipeline supported on movable towers and connectable to a fluid supply, the towers being capable of moving the main pipeline such that it sweeps across a primary field space, an auxiliary span supported on at least one auxiliary tower and in fluid communication with the main pipeline, the auxiliary tower being capable of traveling either within a secondary field space generally outside of the primary field space, or from the primary field space into and out of a secondary field space such that the auxiliary span selectively sweeps across the secondary field space, a plurality of auxiliary fluid emitters connected to the auxiliary span, each emitter being adapted for selectively emitting fluid onto a zone of responsibility, at least some of the emitters being arranged in a plurality of banks with each bank containing several emitters, the improvement comprising:

cycling each bank of emitters through repeated operating cycles at predetermined time intervals as the auxiliary span moves through the secondary field space; and during at least some of the operating cycles, causing the on times of at least some of the banks to differ from those of other banks, the length of on time of a bank of emitters during an operating cycle depending at least in part upon the position of the auxiliary span.

18. The method of claim 17 wherein the step of cycling the banks of emitters is characterized by calculating the on time to produce average flow rates Q at each emitter which satisfy the relation Q/(W*Va)=R where R is the selectable, pre-determined fluid application rate desired, W is the instantaneous effective width of the zone of responsibility of each emitter, and Va is the instantaneous angular velocity of each emitter.

19. The method of claim 18 further characterized in that the on times are predetermined and stored in a data table.

20. The method of claim 17 wherein the step of cycling said banks of emitters is characterized by the steps of creating a control signal and supplying said control signal to a bank of emitters, the emitters in a particular bank being located on the auxiliary span in succession beside one another.

21. The method of claim 19 further comprising the step of selecting the on times in the data table in response to a measurement of the control angle between the auxiliary span and the main pipeline and the relative velocities of the end tower and auxiliary tower.

22. The method of claim 19 further comprising the step of selecting the on times in the data table in response to a measurement of the angle between the auxiliary span and its travel path and the relative velocities of the end tower and auxiliary tower.

23. The method of claim 19 further comprising the step of selecting the on times in the data table in response to a measurement of the control angle between the auxiliary span and the travel path of that span, and the velocities of either or both of the end tower and auxiliary tower.

24. The method of claim 19 further comprising the step of determining the total path of the machine, pre-determining all necessary data table information and combining that information into a single table and storing it in a database, and selecting the on times from the database based on a measurement of the physical position of the machine along the travel path of the machine.

25. The method of claim 17 wherein the step of cycling the banks of emitters is characterized by trial and error analysis of the water application patterns of the various emitters and their interaction in order to obtain the optimum desired application for each specific area.

26. The method of claim 17 wherein the step of cycling the banks of emitters is characterized by determining the total path of the machine and auxiliary span and storing it in a database, performing a series of initial computer simulations to determine the maximum volume of fluid applied by each of the various emitters to each of its affected areas as that specific emitter travels its full path of the field and adjusting the application volumes of the various emitters affecting any specific area to provide the desired combined application to all affected areas.

27. The method of claim 17 wherein all emitters in a bank are turned on during an operating cycle.

28. The method of claim 17 wherein less than all emitters in a bank are turned on during an operating cycle.

29. The method of claim 17 wherein the actual length of time a bank of emitters is turned on during an operating cycle depends at least in part on the angle between the auxiliary span and the main span.

30. The method of claim 17 wherein the actual length of time that a bank of emitters is turned on during an operating cycle may be zero seconds depending at least in part upon the position of the auxiliary span.

31. The method of claim 17 wherein the actual length of time that a bank of emitters is turned on during an operating cycle may be 100 percent of the operating cycle depending at least in part upon the position of the auxiliary span.

32. The method of claim 17 wherein the on times of at least some of the banks of emitters differ from cycle to cycle.

33. The irrigation machine of claim 1 wherein the on times of at least some of the banks of emitters differ from cycle to cycle.

34. The irrigation machine of claim 1 wherein the actual length of time a bank of emitters is turned on during an operating cycle depends at least in part on the angle between the auxiliary span and the main span.

35. The irrigation machine of claim 1 wherein the actual length of time that a bank of emitters is turned on during an operating cycle may be zero seconds depending at least in part upon the position of the auxiliary span.

36. The irrigation machine of claim 1 wherein the actual length of time that a bank of emitters is turned on during an operating cycle may be 100 percent of the operating cycle depending at least in part upon the position of the auxiliary span.

* * * * *